United States Patent

Bach et al.

[11] Patent Number: 5,225,548
[45] Date of Patent: Jul. 6, 1993

[54] INDOPHENOL DYES AND THERMAL TRANSFER THEREOF

[75] Inventors: Volker Bach, Neustadt; Karl-Heinz Etzbach, Frankenthal; Ruediger Sens, Mannheim, all of Fed. Rep. of Germany

[73] Assignee: BASF Aktiengesellschaft, Ludwigshafen, Fed. Rep. of Germany

[21] Appl. No.: 763,272

[22] Filed: Sep. 20, 1991

[30] Foreign Application Priority Data

Oct. 8, 1990 [DE] Fed. Rep. of Germany ....... 4031804

[51] Int. Cl.$^5$ ................. C07D 401/08; C07D 401/12; C07D 405/08; C07D 405/12
[52] U.S. Cl. ................ 544/105; 544/132; 544/133; 544/134; 544/135; 544/137; 544/138; 544/139; 544/140; 544/141; 544/143; 546/165; 546/167; 546/198; 546/199; 546/208; 546/209; 546/210; 546/211; 548/128; 548/136; 548/143; 548/197; 548/205; 548/214; 548/235; 548/373.1; 548/305.1; 548/306.1; 548/304.4; 548/312.1; 548/314.7; 548/345.1; 548/361.1; 548/364.7; 548/364.1
[58] Field of Search ........... 544/105; 546/165; 548/128, 136, 143, 179, 181, 193, 197, 201, 203, 205, 214, 224, 235, 331, 334, 346, 373

[56] References Cited

U.S. PATENT DOCUMENTS 4,695,287 9/1987 Evans et al. ............... 8/471
4,908,437 3/1990 Hansen et al. ............. 534/738

FOREIGN PATENT DOCUMENTS 0307713 3/1989 European Pat. Off. .
0416434 3/1991 European Pat. Off. .
3716656 12/1988 Fed. Rep. of Germany .
61-268493 11/1986 Japan .

OTHER PUBLICATIONS

Patent Abstracts of Japan, vol. 11, No. 125 (M-582) [2572], Apr. 18, 1987, & JP-A-61268493, Nov. 27, 1986, S. Mizuno, et al., "Thermal Transfer Sheet".

Primary Examiner—Richard L. Raymond
Attorney, Agent, or Firm—Oblon, Spivak, McClelland, Maier & Neustadt

[57] ABSTRACT

Indophenol dyes of the formula

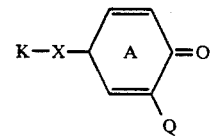

where
X is nitrogen or the radical CH,
Q is a five-membered heterocyclic radical, and
K is a radical of an aniline, aminonaphthalene, aminoquinoline or aminothiazole derivative, and
the radical A can be benzofused, are useful for thermal transfer processes.

2 Claims, No Drawings

INDOPHENOL DYES AND THERMAL TRANSFER THEREOF

The present invention relates to novel indophenol dyes of the formula I

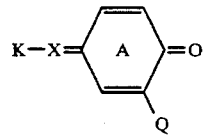

where

X is nitrogen or the radical CH,

Q is a five-membered aromatic heterocyclic radical which may be benzofused and contains from one to three hetero atoms selected from the group consisting of nitrogen, oxygen and sulfur, X is a radical of the formula

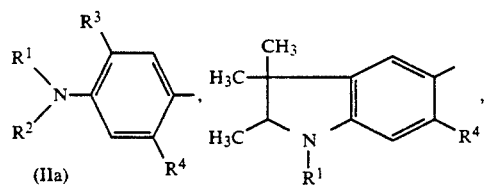

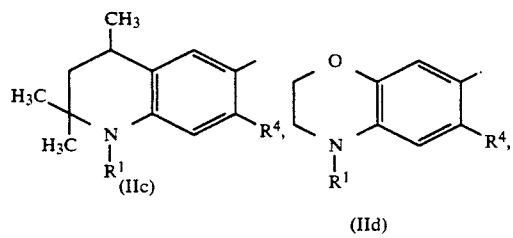

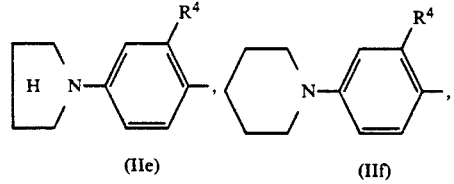

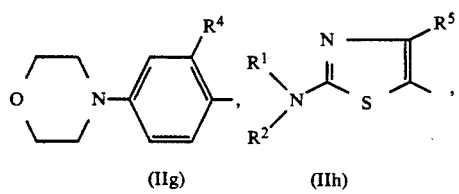

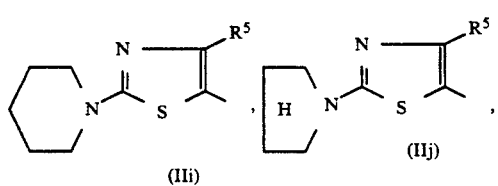

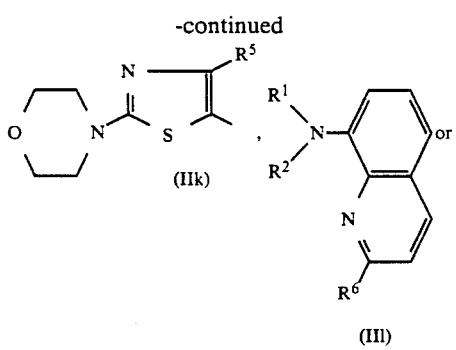

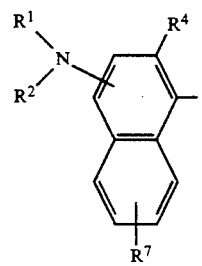

where $R^1$ and $R^2$ are identical or different and each is independently of the other hydrogen, $C_1$–$C_8$-alkyl, which may be substituted and interrupted by one or two oxygen atoms in ether function, or $C_5$–$C_7$-cycloalkyl, $R^3$ is hydrogen, methyl, ethyl, methoxy or ethoxy, $R^4$ is hydrogen, methyl, methoxy, $C_1$–$C_4$-alkylsulfonylamino, $C_1$–$C_4$-mono- or -dialkylaminosulfonylamino or the radical —NHCOR$^8$ or —NHCO$_2$R$^8$, where $R^8$ is in either case phenyl, benzyl, tolyl or $C_1$–$C_8$-alkyl which may be interrupted by one or two oxygen atoms in ether function, $R^5$ is hydrogen, halogen, $C_1$–$C_8$-alkyl, unsubstituted or $C_1$–$C_4$-alkyl- or $C_1$–$C_4$-alkoxy-substituted phenyl, unsubstituted or $C_1$–$C_4$-alkyl- or $C_1$–$C_4$-alkoxy-substituted benzyl, cyclohexyl, thienyl, hydroxyl or $C_1$–$C_8$-monoalkylamino, $R^6$ is hydrogen or methyl, and $R^7$ is hydrogen, methyl, methoxy or acetylamino, and the ring A may be fused to a substituted or unsubstituted benzene ring, and to a process for the thermal transfer thereof.

JP-A-268 493/1986 discloses indophenol and indonaphthol dyes which are intended for application in thermal transfer processes.

It is an object of the present invention to provide novel indophenol dyes which have advantageous application properties.

We have found that this object is achieved by the indophenol dyes of the formula I defined at the beginning.

Any alkyl appearing in the abovementioned formula I may be either straight-chain or branched.

Substituted alkyl appearing in the abovementioned formula I may possess as substituents for example cyano, $C_1$–$C_6$-alkanoyloxy, $C_1$–$C_4$-alkoxycarbonyl or $C_1$–$C_4$-alkoxycarbonyloxy, the last-mentioned of which may in turn be substituted in the alkoxy group by phenyl or $C_1$–$C_4$-alkoxy.

A substituted benzene ring fused to the ring A in formula I may possess as substituents for example methyl, chlorine, methylsulfonylamino or acetylamino and is thus in general mono- or disubstituted.

Suitable $R^1$, $R^2$ and $R^5$ radicals are for example methyl, ethyl, propyl, isopropyl, butyl, isobutyl, secbutyl, pentyl, isopentyl, neopentyl, tert-pentyl, hexyl, 2-methylpentyl, heptyl, octyl and 2-ethylhexyl.

$R^1$ and $R^2$ may each also be for example 2-cyanoethyl, 2- or 3-cyanopropyl, 2-acetyloxyethyl, 2- or 3-acetyloxypropyl, 2-isobutyryloxyethyl, 2- or 3-isobutyryloxypropyl, 2-methoxycarbonylethyl, 2- or 3-methoxycarbonylpropyl 2-ethoxycarbonylethyl, 2- or 3-ethoxycarbonylpropyl 2-methoxycarbonyloxyethyl, 2- or 3-methoxycarbonyloxypropyl, 2-ethoxycarbonyloxyethyl, 2- or 3-ethoxycarbonyloxypropyl, 2-propoxycarbonyloxyethyl, 2- or 3-propoxycarbonyloxypropyl, 2-butoxycarbonyloxyethyl, 2- or 3-butoxycarbonyloxypropyl, 2-(2-phenylethoxycarbonyloxy)ethyl, 2- or 3-(2-phenylethoxycarbonyloxy)propyl, 2-(2-ethoxyethoxycarbonyloxy)ethyl, 2- or 3-(2-ethoxyethoxycarbonyloxy)propyl, cyclopentyl, cyclohexyl or cycloheptyl.

$R^1$ and $R^2$ may each also be for example 2-methoxyethyl, 2- or 3-methoxypropyl, 2-ethoxyethyl, 2- or 3-ethoxypropyl, 2-propoxyethyl, 2- or 3-propoxypropyl, 2-butoxyethyl, 2- or 3-butoxypropyl, 3,6-dioxaheptyl or 3,6-dioxaoctyl.

Suitable $R^4$ is for example methylsulfonylamino, ethylsulfonylamino, propylsulfonylamino, butylsulfonylamino or mono- or di-methylaminosulfonylamino, -ethylaminosulfonylamino, -propylaminosulfonylamino or -butylaminosulfonylamino.

$R^5$ may also be for example phenyl, 2-, 3- or 4-methylphenyl, 2-, 3- or 4-ethylphenyl, 2-, 3- or 4-propylphenyl, 2-, 3- or 4-isopropylphenyl, 2-, 3- or 4-butylphenyl, 2,4-dimethylphenyl, 2-, 3- or 4-methoxyphenyl, 2-, 3- or 4-ethoxyphenyl, 2-, 3- or 4-isobutoxyphenyl or 2,4-dimethoxyphenyl.

The radicals Q are derived from a five-membered aromatic heterocyclic radical which may be benzofused and which has from one to three hetero atoms selected from the group consisting of nitrogen, oxygen and sulfur.

Examples of heterocyclic structures from which the radicals Q are derived and which may carry substituents are pyrazole, imidazole, oxazole, isoxazole, thiazole, isothiazole, 1,2,4-triazole, 1,2,4-oxadiazole, 1,3,4-oxadiazole, 1,2,4-thiadiazole, 1,3,4-thiadiazole, indazole, benzimidazole, benzoxazole, benzisoxazole, benzothiazole, benzisothiazole and 1,2,3-benzotriazole.

Of particular interest are heterocycles of the imidazole, pyrazole, thiazole, isothiazole, 1,2,4-oxadiazole, 1,3,4-oxadiazole, 1,2,4-thiadiazole, 1,3,4-thiadiazole or benzimidazole series.

Of particular importance here are indophenol dyes of the formula I where Q is a radical of the formula

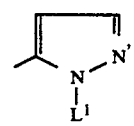
(IIIa)

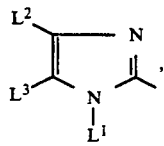
(IIIb)

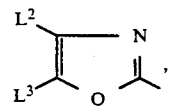
(IIIc)

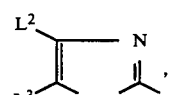
(IIId)

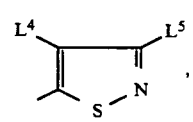
(IIIe)

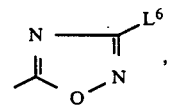
(IIIf)

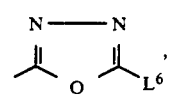
(IIIg)

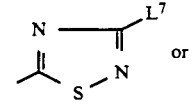
(IIIh)

or

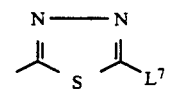
(IIIi)

where $L^1$ is hydrogen, $C_1$-$C_8$-alkyl, benzyl, cyclohexyl, phenyl or tolyl, $L^2$ is hydrogen, chorine, $C_1$-$C_8$-alkyl, $C_1$-$C_8$-monooxaalkyl, phenyl, $C_1$-$C_8$-alkoxy, cyano or $C_1$-$C_8$-alkoxycarbonyl in which the alkyl group may be interrupted by one or two oxygen atoms in ether function, $L^3$ is hydrogen, $C_1$-$C_8$-alkyl, phenyl, cyano, nitro or $C_1$-$C_8$-alkoxycarbonyl in which the alkyl group may be interrupted by one or two oxygen atoms in ether function, or $L^2$ and $L^3$ together form a fused benzene ring, $L^4$ is hydrogen, chlorine, cyano, nitro or $C_1$-$C_8$-alkoxycarbonyl in which the alkyl group may be interrupted by one or two oxygen atoms in ether function, $L^5$ is chlorine, $C_1$-$C_8$-alkyl, $C_1$-$C_8$-monooxaalkyl, $C_1$-$C_8$-alkoxy or $C_1$-$C_8$-alkylthio, $L^6$ is $C_1$-$C_8$-alkyl, and $L^7$ is hydrogen, chlorine, cyano, thiocyanato, $C_1$-$C_8$-alkyl, $C_1$-$C_8$-monooxaalkyl, $C_1$-$C_8$-alkoxy, $C_1$-$C_8$-alkylthio, 2-($C_1$-$C_2$-alkoxycarbonyl)ethylthio or $C_1$-$C_8$-alkoxycarbonyl in which the alkyl group may be interrupted by one or two oxygen atoms in ether function.

$L^1$, $L^2$, $L^3$, $L^5$, $L^6$ and $L^7$ radicals are each for example methyl, ethyl, propyl, isopropyl, butyl, isobutyl, sec-butyl, pentyl, isopentyl, neopentyl, tert-pentyl, hexyl, 2-methylpentyl, heptyl, octyl or 2-ethylhexyl.

$L^2$, $L^5$ and $L^7$ may each also be for example 2-methoxyethyl, 2- or 3-methoxypropyl, 2-ethoxyethyl, 2- or 3-ethoxypropyl, methoxy, ethoxy, propoxy, isopropoxy, butoxy, isobutoxy, sec-butoxy, pentyloxy, isopentyloxy, neopentyloxy, hexyloxy, heptyloxy, octyloxy or 2-ethylhexyloxy.

$L^5$ and $L^7$ may each also be for example methylthio, ethylthio, propylthio, isopropylthio, butylthio, isobutylthio, pentylthio, hexylthio, heptylthio or octylthio.

$L^2$, $L^3$, $L^4$ and $L^7$ may each also be for example methoxycarbonyl, ethoxycarbonyl, propoxycarbonyl, isopropoxycarbonyl, butoxycarbonyl 2-methoxyethoxycarbonyl, 2-ethoxyethoxycarbonyl, 3,6-dioxaheptyloxycarbonyl or 3,6-dioxaoctyloxycarbonyl.

$R^7$ may also be for example 2-methoxycarbonylethylthio or 2-ethoxycarbonylethylthio.

Preference is given to indophenol dyes of the formula I where X is nitrogen.

Particular preference is given to indonaphthol dyes of the formula I where X is nitrogen and K conforms to the formula IIa or IIc.

Particular preference is further given to indonaphthol dyes of the formula I where X is nitrogen and Q conforms to the formula IIIa, IIIb, IIIc or IIId.

The indophenol dyes of the formula I of the present invention are preparable by methods known per se.

For example, a nitroso compound of the formula IVa or a carbonyl compound of the formula IVb

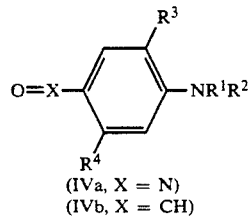

(IVa, X = N)
(IVb, X = CH)

where $R^1$, $R^2$, $R^3$ and $R^4$ are each as defined above, can be condensed with a phenol compound of the formula V

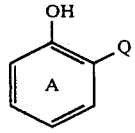

where Q and the ring A are each as defined above (see for example DE-A-3,716,656).

It is also possible to couple p-phenylenediamines of the formula VI

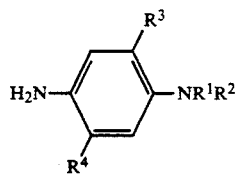

where $R^1$, $R^2$, $R^3$ and $R^4$ are each as defined above, oxidatively with the phenol compounds of the formula V or their 4-chloro derivatives (see for example U.S. Pat. No. 4,695,287).

It is a further object of the present invention to provide a novel process for the thermal transfer of dyes.

In the thermotransfer printing process, a transfer sheet which contains a thermally transferable dye in one or more binders on a substrate, with or without suitable assistants, is heated from the back with an energy source, for example a thermal printing head or a laser, in short pulses (lasting fractions of a second), causing the dye to migrate out of the transfer sheet and diffuse into the surface coating of a receiving medium. The essential advantage of this process is that the amount of dye to be transferred (and hence the color gradation) is readily controllable through adjustment of the energy to be emitted by the energy source.

In general, color recording is carried out using the three subtractive primaries yellow, magenta and cyan (with or without black).

To ensure optimal color recording, the dyes must have the following properties:
ready thermal transferability,
little tendency to migrate within or out of the surface coating of the receiving medium at room temperature,
high thermal and photochemical stability and resistance to moisture and chemical substances,
suitable hues for subtractive color mixing,
a high molar absorption coefficient,
no tendency to crystallize out on storage of the transfer sheet,
ready industrial accessibility.

These requirements are very difficult to meet at one and the same time.

For this reason most of the existing thermal transfer dyes do not have the required combination of properties.

We have found that the object of a novel process for the thermal transfer of dyes is achieved by a process for transferring indophenol dyes from a transfer to a sheet of plastic-coated paper by diffusion or sublimation with the aid of an energy source, which comprises using a transfer with one or more indophenol dyes of the abovementioned formula I.

Compared with the dyes used in existing processes, the dyes to be transferred in the process of the present invention generally possess improved migration properties in the receiving medium at room temperature, readier thermal transferability, higher thermal and photochemical stability, readier industrial accessibility, better resistance to moisture and chemical substances, higher color strength, better solubility or higher purity of hue.

Owing to their high molar extinction coefficients and their high brilliance, the dyes of the formula I employed in the novel process are advantageously suitable for preparing a trichromatic system required for subtractive color mixing.

Blending with triazolopyridine dyes as described in earlier patent application EP-A-416 434 produces a high purity of hue and, in corresponding trichromatic systems, improved black prints.

To prepare the dye transfers required for the process of the present invention, the dyes are incorporated into a suitable organic solvent or into mixtures of solvents together with one or more binders and possibly assistants to form a printing ink in which the dye is preferably present in a molecularly dispersed, i.e. dissolved, form. The printing ink can be applied to the inert substrate by knife coating and air dried.

Suitable organic solvents for the dyes I are for example those in which the solubility of the dyes I is greater than 1% by weight, preferably greater than 5% by weight, at 20° C.

Examples which may be mentioned are ethanol, propanol, isobutanol, tetrahydrofuran, methylene chloride, methyl ethyl ketone, cyclopentanone, cyclohexanone, toluene, chlorobenzene and mixtures thereof.

Suitable binders are all resins or polymer materials which are soluble in organic solvents and capable of binding the dye to the inert substrate in a form in which it will not rub off. Preference is given here to those binders which, after the printing ink has been air dried, hold the dye in a clear, transparent film in which no visible crystallization of the dye occurs.

Examples of such binders are cellulose derivatives, e.g. methylcellulose, ethylcellulose, ethylhydroxyethylcellulose, hydroxypropylcellulose, cellulose acetate or cellulose acetobutyrate, starch, alginates, alkyd resins, vinyl resins, polyvinyl alcohol, polyvinyl acetate, polyvinyl butyrate and polyvinylpyrrolidone. It is also possible to use polymers and copolymers of acrylates or their derivatives, such as polyacrylic acid, polymethyl methacrylate or styrene-acrylate copolymers, polyester resins, polyamide resins, polyurethane resins or natural CH resins such as gum arabic. Further suitable binders are described for example in DE-A-3 524 519.

Preferred binders are ethylcellulose, ethylhydroxyethylcellulose, polyvinyl butyrate and polyvinyl acetate.

The weight ratio of binder to dye may vary, preferably from 1:1 to 10:1.

Possible assistants are release agents as mentioned in EP-A-227 092, EP-A-192 435 and the patent applications cited therein, but also in particular organic additives which prevent the transfer dyes from crystallizing out in the course of storage and heating of the inked ribbon, for example cholesterol or vanillin.

Inert substrate materials are for example tissue, blotting or parchment paper and plastics films possessing good heat resistance, for example metallized or unmetallized polyester, polyamide or polyimide. The inert substrate may additionally be coated on the side facing the thermal printing head with a lubricant or slipping layer in order that adhesion of the energy source, in particular the thermal printing head to the substrate material may be prevented. Suitable lubricants are described for example in EP-A-216 483 and EP-A-227 095. The thickness of the substrate is in general from 3 to 30 μm, preferably from 5 to 10 μm.

The dye-receiving layer can be basically any heat resistant plastics layer which possesses affinity for the dyes to be transferred, for example a modified polycarbonate or polyester. Suitable recipes for the receiving layer composition are described in detail for example in EP-A-227 094, EP-A-133 012, EP-A-133 011, EP-A-111 004, JP-A-199 997/1986, JP-A-283 595/1986, JP-A-237 694/1986 and JP-A-127 392/1986.

The transfer process is effected by means of an energy source, e.g. a laser or preferably a thermal printing head which must be heatable to ≧300° C. in order that the transfer of the dye may take place within the time range t: $0 < t < 15$ msec. In the course of transfer, the dye migrates out of the transfer sheet and diffuses into the surface coating of the receiving medium.

The dyes of the present invention are also advantageously suitable for dyeing synthetic materials, for example polyesters, polyamides or polycarbonates, and in particular textile materials of polyester, polyamide or polyester cotton blend fabrics.

The novel dyes are also advantageously suitable for producing color filters, as described for example in EP-A-399 473.

They can also be used with advantage to produce toners for use in electrophotography.

Further details concerning the invention may be discerned from the Examples which follow, in which the percentages are by weight, unless otherwise stated.

PREPARATION OF DYES

Example 1

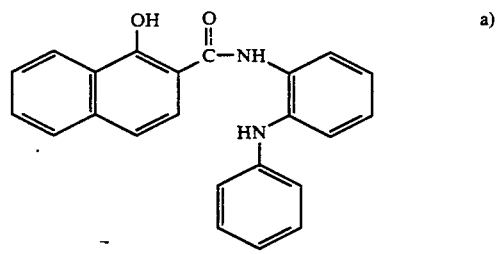

a)

37.6 g of 1-hydroxynaphthalene-2-carboxylic acid and 36.8 g of 2-aminodiphenylamine were dissolved in 250 ml of dioxane and heated to 50° C. A solution of 49.6 g of dicyclohexylcarbodiimide in 150 ml of dioxane was added dropwise with vigorous stirring until conversion was complete (TLC). After cooling down to room temperature, the precipitated urea was filtered off with suction, the filtrate was stirred into 4 l of ice-water, and the resulting precipitate was filtered off with suction, dried and recrystallized from n-propanol [melting point: 128°–129° C.; $R_f$ value (SiO$_2$, 3:2 v/v toluene/ethyl acetate): 0.87].

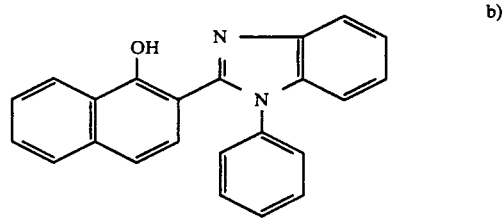

b)

27 g of a compound obtained under 1 a were heated in 270 ml of acetic acid at the boil until conversion was complete (TLC), which is followed by stirring into 2.7 l of ice-water, extracting with ethyl acetate, drying and removal of the solvent under reduced pressure. Yield: 22.5 g [melting point: 168°–169° C., $R_f$ value (SiO$_2$, 5:1 v/v toluene/ethyl acetate): 0.92].

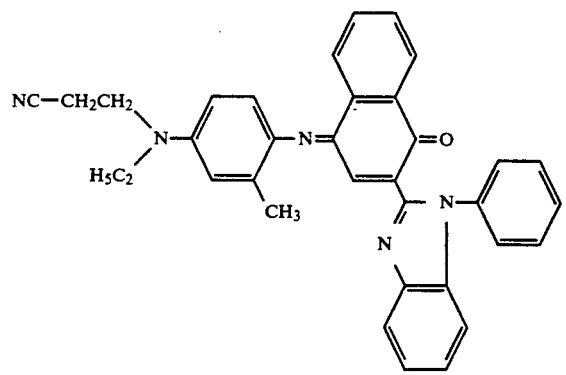

3.8 g of N-(2-cyanoethyl)-N-ethyl-m-toluidine were nitrosated in a conventional manner with sodium nitrite in a solution which had been acidified with hydrochloric acid. The resulting nitroso compound was taken up in methylene chloride, added to a solution of 6.8 g of the naphthol (1b) in 50 ml of methylene chloride and 50 ml of acetic anhydride and stirred at room temperature until conversion was complete (TLC). Then 100 ml of water were added, the mixture was heated to 40° C. for 1 hour, and then substantially all of the methylene chloride was distilled off. After cooling down to room temperature, the dye paste was separated off, washed with water, dissolved in N,N-dimethylformamide, precipitated with water, filtered off with suction, dried at 50° C. under reduced pressure and chromatographed with 3:2 v/v toluene/ethyl acetate over silica gel ($R_f$ value (3:2 v/v toluene/ethyl acetate): 0.54). $\lambda_{max}$ (measured in methylene chloride): 620 nm. Yield: 5.5 g.

The same method was used to obtain the dyes of the formula

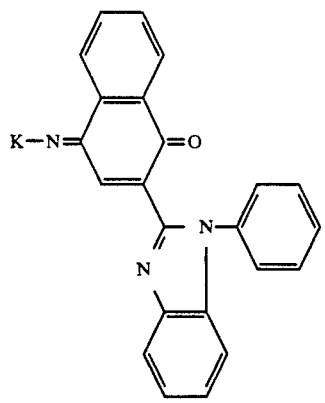

listed below in Table 1.

TABLE 1

| Example No. | K | $R_f$ value | $\lambda_{max}$ [nm] |
|---|---|---|---|
| 2 | N(C₄H₉)(C₂H₄—CN)—(p-tolyl) | 0.63[b] | 600[c] |
| 3 | N(C₂H₅)₂—(p-tolyl) | 0.35[a] | 638[c] |
| 4 | N(C₄H₉)₂—(p-tolyl) | 0.55[a] | 644[c] |
| 5 | N(C₄H₉)₂—(4-methyl-3-methylphenyl) [C₄H₉\N(C₄H₉)-aryl with CH₃] | 0.57[a] | 662[c] |
| 6 | N(C₂H₅)₂—(4-methyl-3-methylphenyl) | 0.67[b] | 655[c] |
| 7 | N(C₂H₅)(C₂H₄—OOCCH₃)—(aryl with NHCOCH₂OCH₃) | 0.30[b] | 639[d] |
| 8 | N(C₂H₅)(C₂H₄—OOCCH₃)—(3-methylphenyl) | 0.22[a] | 639[c] |
| 9 | N(C₂H₅)₂—(aryl with NHCOCH₃) | 0.19[b] | 672[c] |

TABLE 1-continued

| Example No. | K | $R_f$ value | $\lambda_{max}$ [nm] |
|---|---|---|---|
| 10 | 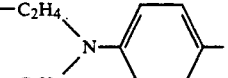 | 0.21[a] | 625[c] |
| 11 |  | 0.63[a] | 648[c] |
| 12 | 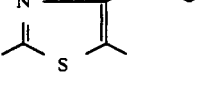 | 0.20[a] | 627[c] |
| 13 | 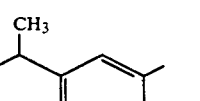 | 0.64[a] | 665[d] |
| 14 |  | 0.71[b] | 637[c] |

[a]Eluent: 5:1 v/v toluene/ethyl acetate
[b]Eluent: 3:2 v/v toluene ethyl acetate
[c]measured in methylene chloride
[d]measured in acetone

Example 15

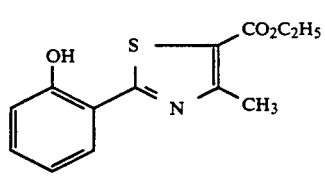 a)

3.6 g of 2-hydroxythiobenzamide and 3.3 g of ethyl 2-chloroacetate were stirred in 80 ml of isopropanol under reflux until conversion was complete (TLC). After cooling down to room temperature, the precipitate was filtered off with suction, washed with isopropanol and dried (melting point: 88°–90° C.).

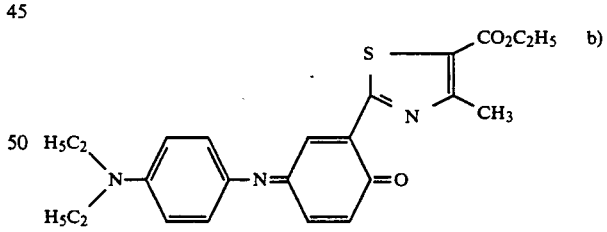 b)

2.1 g of N,N-diethylaniline were nitrosated in a conventional manner with sodium nitrite in solution acidified with hydrochloric acid. The resulting nitroso compound was taken up in methylene chloride, added to a solution of 3.7 g of the phenol (a) in 35 ml of methylene chloride and 37 ml of acetic anhydride and stirred at room temperature until conversion was complete (TLC). Then 100 ml of water were added, the mixture was heated to 40° C. for 1 hour and then substantially all the methylene chloride was distilled off. After cooling down to room temperature, the dye paste was separated off, washed with water, dissolved in N,N-dimethylformamide, precipitated with water, filtered off with suction, dried under reduced pressure and chromatographed with 5:1 v/v toluene/ethyl acetate over silica gel ($R_f$ value (5:1 v/v toluene/ethyl acetate): 0.52). $\lambda_{max}$ (measured in acetone): 669 nm.

TRANSFER OF DYES

For a simple quantitative examination of the transfer characteristics of the dyes, the thermal transfer was effected with large hotplates instead of a thermal printing head, the transfer temperature being varied within the range 70° C.<T<120° C. while the transfer time was fixed at 2 minutes.

α) General recipe for coating the substrate with dye: 1 g of binder was dissolved in 8 ml of 8:2 v/v toluene/ethanol at 40°-50° C. A solution of 0.25 g of dye in 15 ml of tetrahydrofuran was added with stirring and, if necessary, insoluble residue was filtered off. The print paste thus obtained was applied with an 80 μm doctor blade to a polyester sheet (thickness: 6–10 μm) and dried with a hair dryer.

β) Testing of thermal transferability

The dyes used were tested as follows:

The polyester sheet donor containing the in-test dye in the coated front was placed face down on a sheet of commercially available paper receptor (further details below) and pressed down. Donor/receptor were then wrapped in aluminum foil and heated between two hotplates at various temperatures T (within the temperature range 70° C.<T<120° C.). The amount of dye diffusing into the bright plastics layer of the receptor is proportional to the optical density (=absorbance A). The latter was determined photometrically. The plots of the logarithm of the absorbance A of the colored receptor papers measured within the temperature range from 80° to 110° C. against the reciprocal of the corresponding absolute temperature are straight lines from whose slope it is possible to calculate the activation energy $\Delta E_T$ for the transfer experiment:

$$\Delta E_T = 2.3 \cdot R \cdot \frac{\Delta \log A}{\Delta \frac{1}{T}}$$

To complete the characterization, the plots additionally reveal the temperature T*[°C.] at which the absorbance A of the colored receptor papers attains the value 1.

The dyes listed below in Table 2 were processed according to α) and the dye-coated transfers obtained were tested for their transfer characteristics according to β). The table shows in each case the thermotransfer parameters T* and $\Delta E_T$ and the weight ratio of dye:binder.

The following abbreviations apply:
D=dye
VY-SX=Hitachi VY-SX Paper (receptor)
VY-C=Hitachi VY-C Paper (receptor)
VY-T=Hitachi VY-T Paper (receptor)
HCVPP=Hitachi Color Video Print Paper (receptor)
B=binder
(EHEC=ethylhydroxyethylcellulose
V=Vylon ®290 (from Toyobo)
PVB=polyvinyl butyrate
EC=ethylcellulose)

| Example No. | Dye No. | ΔET [kJ/mol] | T [°C.] | B | D:B | Receptor |
|---|---|---|---|---|---|---|
| 16 | 2 | 82 | 104 | EHEC | 1:1 | HCVPP |
| 17 | 2 | 93 | 112 | EHEC | 1:1 | VY-C |
| 18 | 2 | 71 | 86 | V | 1:2 | HCVPP |
| 19 | 2 | 56 | 93 | V | 1:2 | VY-C |
| 20 | 2 | 84 | 99 | PVB | 1:1 | HCVPP |
| 21 | 2 | 77 | 106 | PVB | 1:1 | VY-C |
| 22 | 3 | 92 | 97 | EHEC | 1:1 | HCVPP |
| 23 | 3 | 105 | 104 | EHEC | 1:1 | VY-C |
| 24 | 3 | 12 | 79 | V | 1:2 | HCVPP |
| 25 | 3 | 49 | 92 | V | 1:2 | VY-C |
| 26 | 3 | 106 | 100 | PVB | 1:1 | HCVPP |
| 27 | 3 | 122 | 105 | PVB | 1:1 | VY-C |
| 28 | 1 | 83 | 109 | EHEC | 1:1 | HCVPP |
| 29 | 1 | 96 | 114 | EHEC | 1:1 | VY-C |
| 30 | 1 | 50 | 105 | V | 1:2 | VY-C |
| 31 | 1 | 70 | 97 | PVB | 1:1 | HCVPP |
| 32 | 1 | 76 | 101 | PVB | 1:1 | VY-C |
| 33 | 4 | 123 | 87 | EHEC | 1:1 | HCVPP |
| 34 | 4 | 94 | 96 | EHEC | 1:1 | VY-C |
| 35 | 4 | 54 | 70 | V | 1:2 | HCVPP |
| 36 | 4 | 43 | 78 | V | 1:2 | VY-C |
| 37 | 4 | 34 | 83 | V | 1:2 | VY-T |
| 38 | 4 | 110 | 93 | PVB | 1:1 | HCVPP |
| 39 | 4 | 114 | 101 | PVB | 1:1 | VY-C |
| 40 | 4 | 114 | 89 | PVB | 1:1 | VY-T |
| 41 | 5 | 100 | 92 | EHEC | 1:1 | HCVPP |
| 42 | 5 | 114 | 101 | EHEC | 1:1 | VY-C |
| 43 | 5 | 43 | 79 | V | 1:2 | VY-C |
| 44 | 5 | 96 | 95 | PVB | 1:1 | HCVPP |
| 45 | 5 | 94 | 105 | PVB | 1:1 | VY-C |
| 46 | 6 | 99 | 97 | EHEC | 1:1 | HCVPP |
| 47 | 6 | 118 | 103 | EHEC | 1:1 | VY-C |
| 48 | 6 | 38 | 98 | V | 1:2 | VY-C |
| 49 | 6 | 119 | 102 | PVB | 1:1 | HCVPP |
| 50 | 6 | 51 | 106 | PVB | 1:1 | VY-C |
| 51 | 10 | 91 | 106 | EC | 1:2 | VY-C |
| 52 | 10 | 66 | 105 | EC | 1:2 | HCVPP |
| 53 | 10 | 88 | 96 | EC | 1:2 | VY-SX |
| 54 | 12 | 126 | 104 | EHEC | 1:1 | HCVPP |
| 55 | 12 | 112 | 108 | EHEC | 1:1 | VY-C |
| 56 | 12 | 40 | 92 | V | 1:2 | VY-C |
| 59 | 12 | 81 | 104 | PVB | 1:1 | HCVPP |
| 60 | 12 | 97 | 108 | PVB | 1:1 | VY-C |
| 59 | 14 | 111 | 105 | EHEC | 1:1 | HCVPP |
| 60 | 14 | 124 | 111 | EHEC | 1:1 | VY-C |
| 61 | 14 | 62 | 107 | V | 1:2 | VY-C |
| 62 | 14 | 87 | 107 | PVB | 1:1 | HCVPP |
| 63 | 14 | 71 | 112 | PVB | 1:1 | VY-C |

Good results are also obtained with dyes of the following formulae:

| Example No. | |
|---|---|
| 64 | 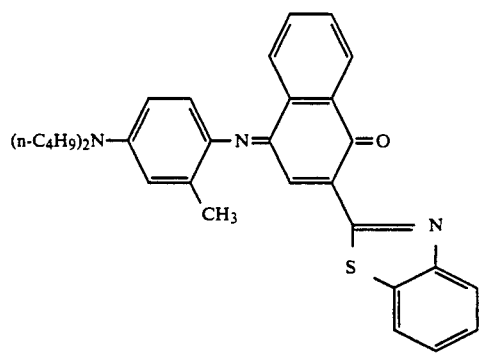 |
| 65 | 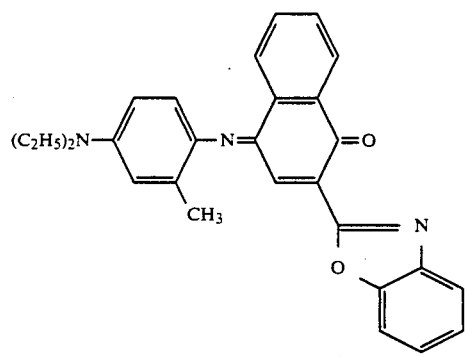 |
| 66 | 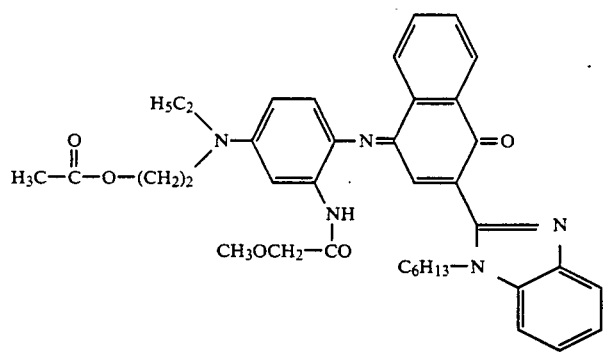 |
| 67 | 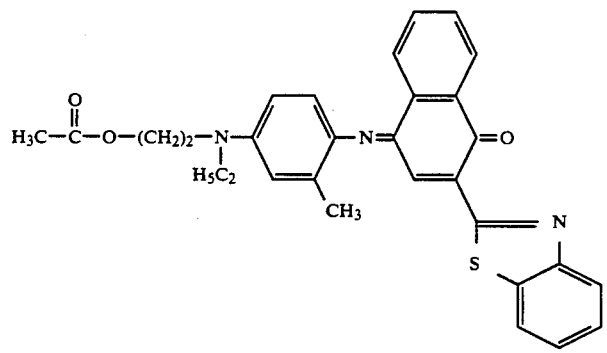 |

-continued
| Example No. | |
|---|---|
| 68 | 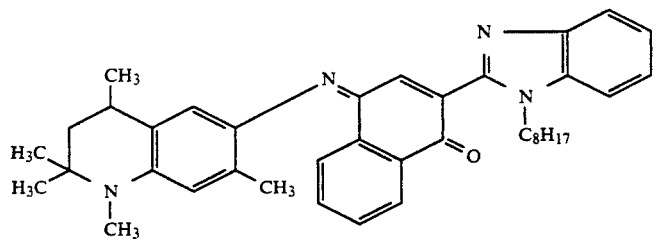 |
| 69 | 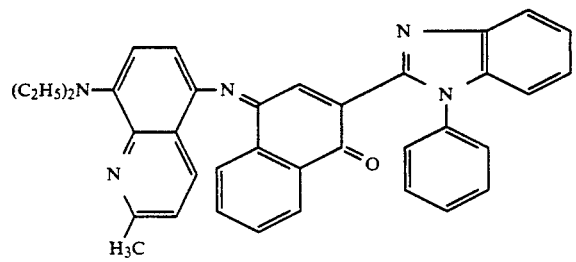 |
| 70 | 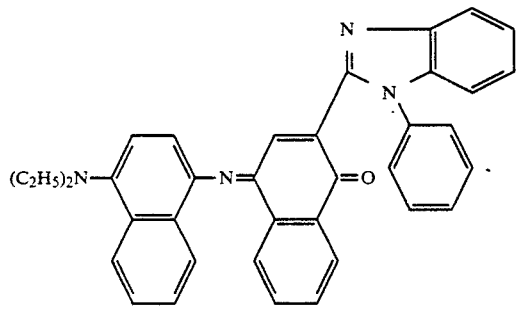 |
| 71 | 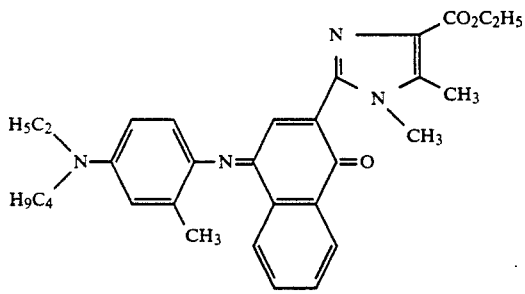 |
| 72 | 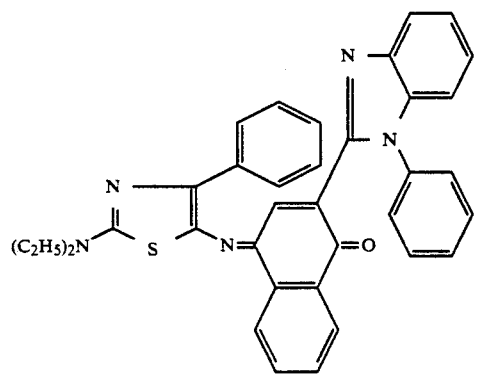 |

-continued
| Example No. | |
|---|---|
| 73 | 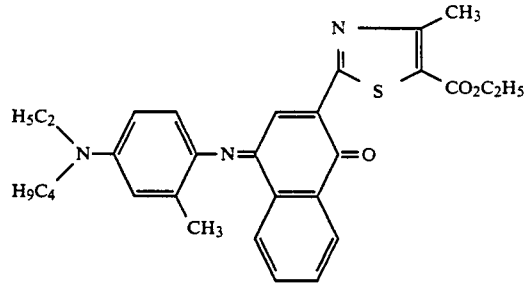 |
| 74 | 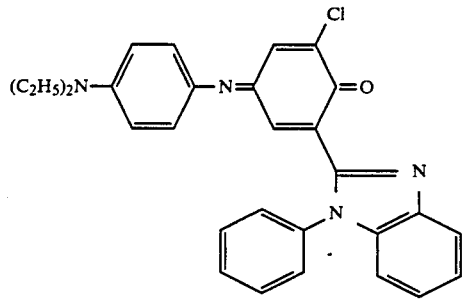 |
| 75 | 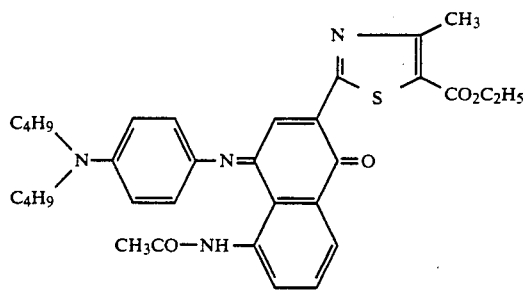 |
| 76 | 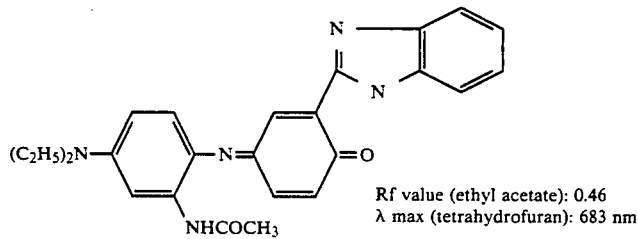 Rf value (ethyl acetate): 0.46<br>λ max (tetrahydrofuran): 683 nm |
| 77 | 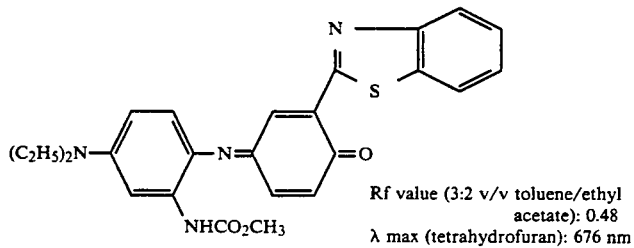 Rf value (3:2 v/v toluene/ethyl acetate): 0.48<br>λ max (tetrahydrofuran): 676 nm |
We claim:
1. An indophenol dye of the formula I
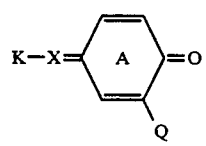
(I)

where
X is nitrogen or the radical CH,
Q is an aromatic heterocyclic radical selected from the group consisting of pyrazole, imidazole, oxazole, isoxazole, thiazole, isothiazole, indazole, benzimidazole, benzoxazole, benzisoxazole, benzothiazole and benzisothiazole,
K is a radical of the formula

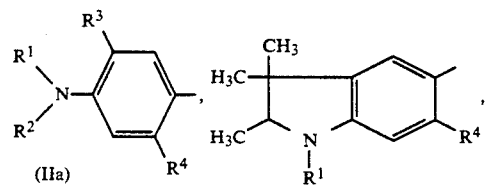

(IIa)     (IIb)

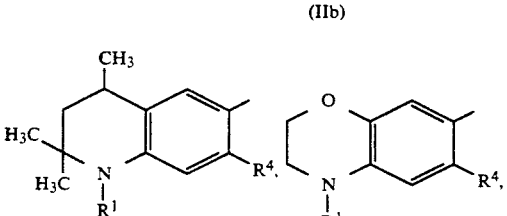

(IIc)     (IId)

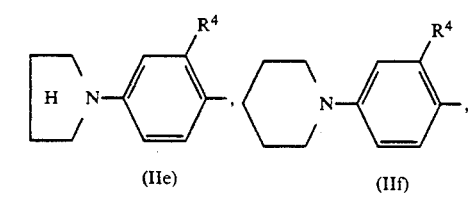

(IIe)     (IIf)

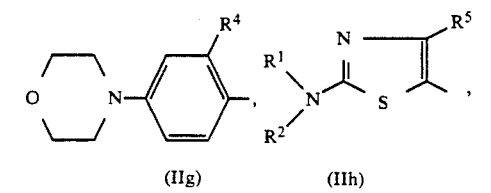

(IIg)     (IIh)

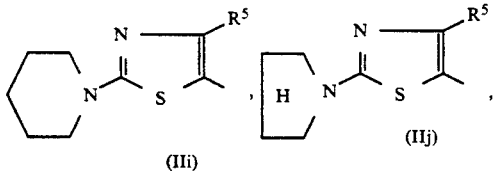

(IIi)     (IIj)

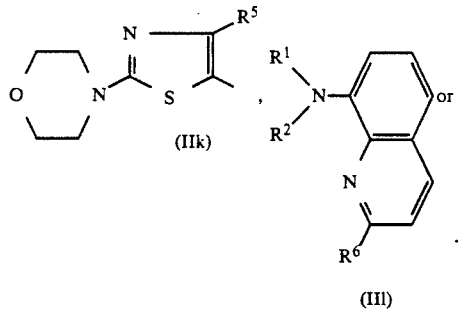

(IIk) , (III) or

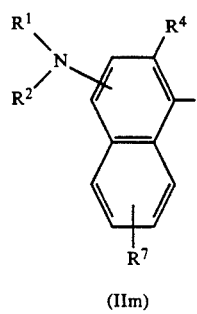

(IIm)

where
R$^1$ and R$^2$ are identical or different and each is independently of the other hydrogen, C$_1$-C$_8$-alkyl, which may be substituted and interrupted by one or two oxygen atoms in ether function, or C$_5$-C$_7$-cycloalkyl,
R$^3$ is hydrogen, methyl, ethyl, methoxy or ethoxy,
R$^4$ is hydrogen, methyl methoxy, C$_1$-C$_4$-alkylsulfonylamino, C$_1$-C$_4$-mono- or -dialkylaminosulfonylamino or the radical —NHCOR$^8$ or —NHCO$_2$R$^8$, where R$^8$ is in either case phenyl, benzyl, tolyl or C$_1$-C$_8$-alkyl which may be interrupted by one or two oxygen atoms in either function,
R$^5$ is hydrogen, halogen, C$_1$-C$_8$-alkyl, unsubstituted or C$_1$-C$_4$-alkyl- or C$_1$-C$_4$-alkoxy-substituted phenyl, unsubstituted or C$_1$-C$_4$-alkyl- or C$_1$-C$_4$-alkoxy-substituted benzyl, cyclohexyl, thienyl, hydroxyl or C$_1$-C$_8$-monoalkylamino,
R$^6$ is hydrogen or methyl, and
R$^7$ is hydrogen, methyl methoxy or acetylamino, and the ring A may be fused to a substituted or unsubstituted benzene ring.

2. An indophenol dye as claimed in claim 1, wherein X is nitrogen.

* * * * *